US011385319B2

(12) United States Patent
Viitala et al.

(10) Patent No.: US 11,385,319 B2
(45) Date of Patent: Jul. 12, 2022

(54) FEEDBACK LOOP FOR IMPROVING PERFORMANCE OF A RADIO-BASED POSITIONING SYSTEM

(71) Applicant: HERE GLOBAL B.V., Eindhoven (NL)

(72) Inventors: Mika Viitala, Tampere (FI); Marko Luomi, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 193 days.

(21) Appl. No.: 16/801,769

(22) Filed: Feb. 26, 2020

(65) Prior Publication Data

US 2021/0263130 A1 Aug. 26, 2021

(51) Int. Cl.
*G01S 5/02* (2010.01)
(52) U.S. Cl.
CPC .......... *G01S 5/0294* (2013.01); *G01S 5/0252* (2013.01); *G01S 5/0284* (2013.01)
(58) Field of Classification Search
CPC ..... G01S 5/0292; G01S 5/0284; G01S 5/0252
USPC ....................................................... 342/451
See application file for complete search history.

(56) References Cited

U.S. PATENT DOCUMENTS

| 7,551,579 | B2 | 6/2009 | Alizadeh-Shabdiz et al. |
| 9,301,100 | B1 | 3/2016 | Jampani et al. |
| 10,080,208 | B2 | 9/2018 | Morgan et al. |
| 10,477,609 | B2 | 11/2019 | Yang et al. |
| 11,156,694 | B2 * | 10/2021 | Ivanov .................. H04W 64/00 |
| 2018/0332558 | A1 | 11/2018 | Chan et al. |
| 2019/0373413 | A1 * | 12/2019 | Kong ..................... H04W 4/023 |
| 2020/0379122 | A1 * | 12/2020 | Tontiruttananon .... G01S 19/215 |
| 2021/0063522 | A1 * | 3/2021 | Rauhala ................ G01S 5/0252 |

FOREIGN PATENT DOCUMENTS

| CN | 106713003 A | * | 5/2017 | |
| GB | 2551589 A | * | 12/2017 | ........... G01S 5/0252 |
| KR | 10-0947805 B1 | | 3/2010 | |
| KR | 10-2018-0031150 A | | 3/2018 | |

(Continued)

OTHER PUBLICATIONS

Extended European Search Report from corresponding EP Appln. No. 21158674.8-1206 (9 pps.).

*Primary Examiner* — Harry K Liu
(74) *Attorney, Agent, or Firm* — Michael Krasniansky; HERE Technologies

(57) ABSTRACT

Disclosed is an approach for improving positioning quality via a feedback loop between a radio-based positioning system and a client device, such as a tracking system. In particular, the tracking system or other client device may request and then receive a position estimate from the positioning system. The tracking system could then make a determination that the position estimate is incorrect, such as by determining that it is an outlier relative to a location trace, for instance. Responsive to this determination, the tracking system may transmit, to the position system, an indication of radio node(s) associated with the incorrect position estimate. Based on this indication, the positioning system could then exclude one or more of those radio node(s) from a radio map, thereby improving quality of the radio map and in turn quality of future position estimates, among other advantages.

20 Claims, 9 Drawing Sheets

(56) References Cited

FOREIGN PATENT DOCUMENTS

| KR | 10-1848232 B1 | 4/2018 | |
|---|---|---|---|
| WO | 2018-222354 A1 | 12/2018 | |
| WO | WO-2019034238 A1 * | 2/2019 | ......... G01S 5/02527 |

* cited by examiner

FEEDBACK LOOP FOR IMPROVING PERFORMANCE OF A RADIO-BASED POSITIONING SYSTEM

FIELD OF THE DISCLOSURE

Embodiments of the present disclosure relate to the field of positioning technologies, and more specifically to methods and systems for improving positioning performance.

BACKGROUND

In practice, positioning technologies could provide for numerous benefits, such as by enabling tracking of assets and/or navigation through indoor and outdoor environments, among other possibilities. Such benefits may be realized through the development of positioning system(s) and associated service(s) that may collectively provide a solution to various positioning-related use cases. Generally speaking, a positioning solution can be commercially successful if it is globally scalable, has low deployment and maintenance costs, and offers an acceptable end-user experience. To facilitate this, the solution could be based on existing infrastructure in buildings and on existing capabilities in consumer devices, such as on radio (e.g., Wi-Fi and/or Bluetooth) technologies that are already supported in numerous consumer devices on the market.

One approach for such radio-based positioning could involve crowdsourced collection of radio data from mobile devices, which may then be used for generating or updating radio map(s). This radio data may represent measurements of radio signals respectively observed by the mobile devices, which may include received signal strength value(s) and/or respective identifiers of radio node(s) emitting those signal(s), among other options. And once a radio map is generated or updated based on this data, the radio map may effectively model a radio environment in an indoor and/or outdoor area, and could enable an entity (e.g., a server or a mobile device) to determine characteristics of radio signals that are expected to be observable respectively at different locations in the area. Given this, the entity could compare further (e.g., radio) measurements from a mobile device to the radio map, to estimate a position of the mobile device in the area.

In some situations, however, certain crowdsourced data may not be suitable for use as basis to generate or update a radio map. And if such unsuitable data is inadvertently used as basis for generating or updating a radio map, the radio map may not accurately model a radio environment in an area, thereby degrading the radio-based positioning performance.

One example of such unsuitable data is data associated with mobile radio nodes, which may include radio nodes deployed in moving vehicles or mobile devices providing Wi-Fi hotspots, among others. More specifically, radio signals observable at a given location may have predictable characteristics in accordance with a radio map, as long as the radio environment remains unchanged e.g., due to stationary radio node(s) emitting those radio signals. Yet, if a radio map is generated based on data collected when a radio node is at one location and that radio node then moves to a different location, the radio environment will change and will no longer be accurately represented by the radio map. Consequently, after the radio node at issue moves, use of that radio map may lead to inaccurate position estimates.

Given this, it is beneficial to identify mobile radio nodes and/or any other radio nodes that tend to cause inclusion of unsuitable data in radio map(s), so that data associated with such nodes is removed or otherwise prevented from inclusion in radio map(s). For instance, this may involve removing from a radio map and/or preventing inclusion in the radio map of (i) received signal strength values for signals emitted by mobile radio node(s) and/or (ii) respective identifiers of those mobile radio nodes, among other possibilities.

Unfortunately, there are various deficiencies with respect to existing techniques for identifying such unsuitable nodes and/or data. For instance, machine learning techniques could be applied to determine which radio nodes are mobile, but such techniques tend to be computationally intensive and/or prone to errors. Additionally or alternatively, such techniques may rely on there being a certain extent of available crowdsourced data, but such an extent may not always be available. Therefore, a technical improvement is desired and would advantageously help improve performance of radio-based positioning systems.

SUMMARY

Disclosed herein is an improved approach for identifying radio nodes associated with unsuitable radio data. In accordance with the disclosed approach, a feedback loop could be established between a radio-based positioning system and a client of the positioning system, so that the client could inform the positioning system about radio node(s) associated with incorrect positioning estimate(s) and thus enable the positioning system to exclude such radio node(s) from radio map(s). One client that is particularly suitable for this feedback loop is a tracking system that communicates with the positioning system.

Generally, the tracking system could request and receive position estimates from the positioning system. In particular, a tracked entity, such as a tracking device attached to an asset, could collect measurements of a radio environment, which may include received signal strength values and/or identifiers of radio node(s) as discussed. The tracked entity could provide data representing those radio measurements directly to the positioning system or via a tracking server. In either case, the positioning system could use those measurements to estimate a position of the tracked entity as described, and could provide the position estimate to the tracking server.

In this way, the tracking server could collect position estimates that represent positions of the tracked entity over time, and may use those position estimates to generate or otherwise maintain a location trace for that tracked entity. Such a location trace could provide for various benefits and use cases. For instance, the location trace could be made available to user(s) via a graphical user interface (GUI), so that the user(s) could have information related to the whereabouts of the tracked entity (e.g., a particular asset being shipped to a user).

Because the tracking server can have access to a history of position estimates for a tracked entity by way of a location trace, the tracking server could use the location trace to determine if a particular position estimate is incorrect in a non-computationally intensive manner. For example, the tracking server could determine that the particular position estimate is an outlier compared to other position estimates previously requested and received for a particular location trace, and could responsively deem that particular position estimate to be incorrect. The particular position estimate may be incorrect, e.g., due to the tracked entity providing data to the positioning system that includes measurements of signals emitted by mobile radio node(s).

Given this, according to the disclosed approach, the tracking server could be configured to inform the positioning system about radio node(s) associated with incorrect position estimates. And the positioning system could then exclude those radio node(s) from radio map(s). Such excluding could involve removal of data associated with those node(s) from radio map(s) and/or blacklisting of those radio node(s) to prevent inclusion of such data in radio map(s).

In this way, the disclosed approach may help significantly improve the quality radio map(s) in an accurate and a non-computationally intensive manner. Such higher quality radio maps may enable more accurate position estimates, which are important for various use cases.

For example, accurate position estimates are important in tracking-related use cases. In particular, incorrect position estimates are especially unwelcome in tracking systems, because they may lead to incorrect assessment of asset whereabout, incorrect geofence transitions, and/or incorrect time-of-arrival estimates, among other problems. Such tracking systems are often relied upon in logistics use cases involving transportation mechanism (e.g., vehicles, ships, and/or trains) that frequently host mobile radio nodes, thereby making the above-described issues associated with mobile radio nodes even more prevalent in such use cases. Thus, the disclosed approach may be particularly beneficial for improving performance of such tracking systems. Other examples and advantages are also possible.

Accordingly, in one aspect, disclosed is a first method. The first method involves: transmitting, by one or more processors and to a positioning system, a request for a position estimate; in response to the request, receiving, by the one or more processors, the position estimate from the positioning system; making a determination, by the one or more processors, that the position estimate is incorrect; and in response to making the determination, transmitting, by the one or more processors and to the positioning system, an indication of one or more radio nodes associated with the position estimate determined to be incorrect, thereby enabling the positioning system to exclude one or more of the radio nodes from a radio map.

In another aspect, disclosed is a second method. The second method involves: receiving, by one or more processors of a positioning system and from a client device, a request for a position estimate; in response to the request, transmitting, by the one or more processors, the position estimate to the client device; receiving, by the one or more processors and from the client device, an indication of one or more radio nodes associated with the position estimate, the indication corresponding to the position estimate being incorrect; and based at least on the received indication, performing, by the one or more processors, a procedure to exclude one or more of the radio nodes from a radio map.

In yet another aspect, disclosed is a first apparatus (e.g., of a tracking system) including one or more processors, a non-transitory computer readable medium, and program instructions stored on the non-transitory computer readable medium. The program instructions may be executable by the one or more processors to perform any operations described herein, such as any of those set forth in the first method, among others.

In yet another aspect, disclosed is a second apparatus (e.g., of a positioning system) including one or more processors, a non-transitory computer readable medium, and program instructions stored on the non-transitory computer readable medium. The program instructions may be executable by the one or more processors to perform any operations described herein, such as any of those set forth in the second method, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

DETAILED DESCRIPTION

Figure 1:
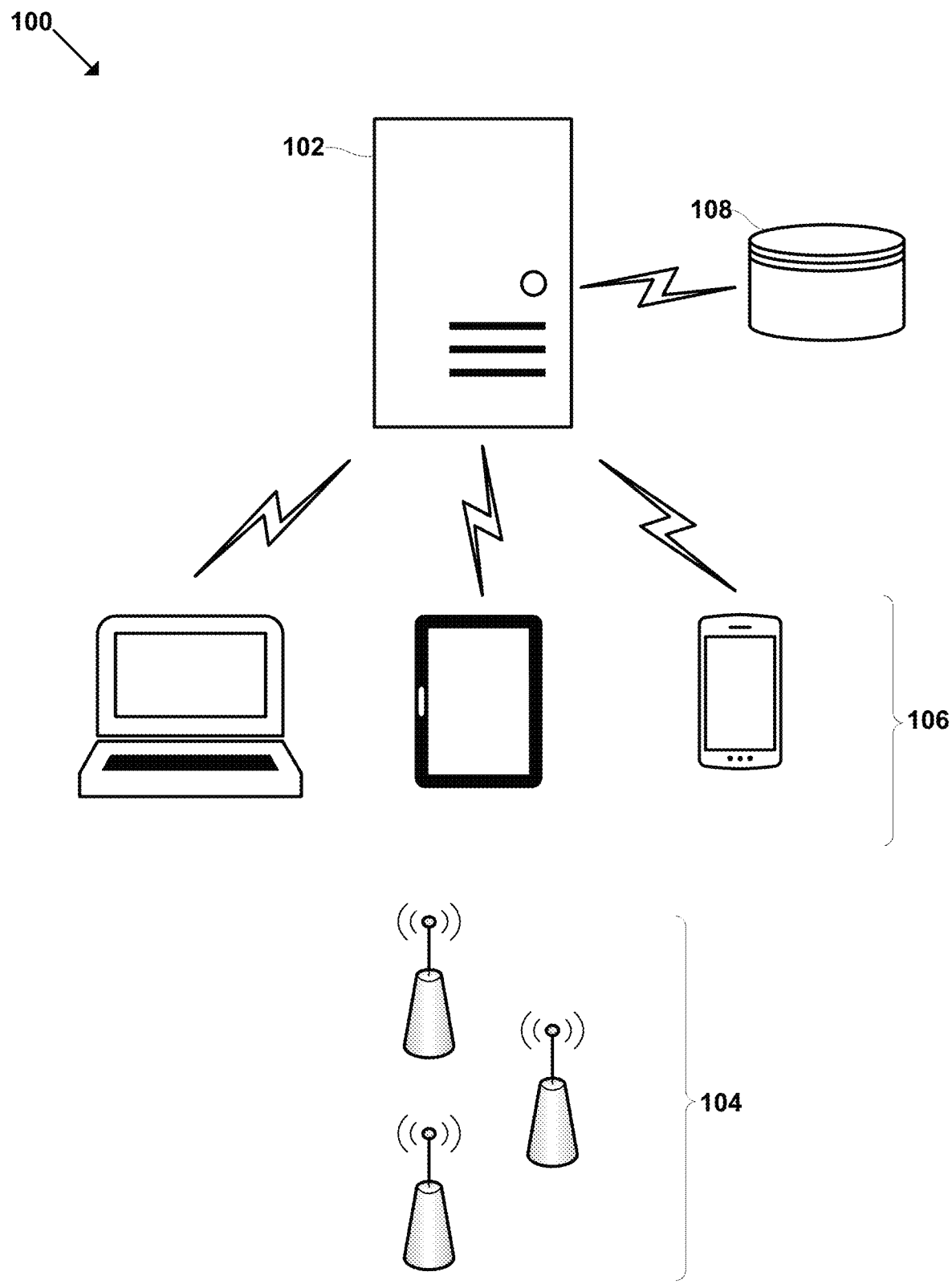
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. Example Positioning Systems

Positioning methods that are seamless and available at all times might rely upon novel systems and solutions that are specifically developed and, if necessary, deployed for this purpose. Traditional positioning technologies, which are mainly used outdoors (e.g., satellite and cellular positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case of outdoor scenarios, there may be situations where e.g. satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure in the buildings and on existing capabilities in the consumer devices. For example, the positioning solution could be based on technologies like Wi-Fi and/or Bluetooth, which are already supported in numerous devices, such as smartphones, tablets, laptops and even in the majority of the feature phones. Thus, it is advantageous to develop a positioning solution that uses cellular and/or non-cellular radio signals in a way that (i) makes it possible to achieve desired horizontal and vertical positioning accuracy and (ii) provides the ability to quickly build global coverage.

FIG. 1 illustrates an arrangement 100 that may enable a positioning solution, in accordance with example implementations. Arrangement 100 could include a server system 102, radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UMTS), Long Term Evolution (LTE), and/or 5G base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning.

In practice, a non-GNSS based radio positioning system could include or otherwise rely on radio devices (e.g., radio devices 104) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in a particular area, such as an indoor area.

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 102 could collect "fingerprint(s)" from mobile device(s). A fingerprint collected from a given mobile device may contain or otherwise represent a position estimate and measurement(s) by the mobile device. The position estimate may be, for example, based on GNSS data, sensor data, and/or previously collected radio measurements, or may be manually inputted via a user interface. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

In some implementations, collected fingerprints could enable generating or updating of a radio map for a 3D positioning solution e.g., in multi-level buildings. In particular, features of radio signals (e.g., received signal strength) that may be used for horizontal positioning may vary significantly from one building layer to another in different altitude levels at the same horizontal position, often due to the radio signal attenuation caused by a building's structure. This might affect the eventual performance of a radio-based positioning system. Therefore, it would be particularly beneficial for a radio map to indicate characteristics of radio signals that are expected to be observable respectively at different attitudes/floors of a multi-level building.

Given this, collected fingerprint(s) could additionally or alternatively include data representing or otherwise enabling determination of altitude(s) of mobile device(s). In particular, fingerprint(s) may include altitude data representing absolute and/or relative altitude(s) of a mobile device. Additionally or alternatively, fingerprint(s) may include pressure data representing pressure measurements, and such pressure data can be used to determine altitude(s) and/or altitude changes, e.g., according to a predictable relationship between pressure and altitude.

In practice, there may be various approaches for determining or otherwise generating altitude data. In one example, altitude data could be determined according to GNSS-based altitude estimate(s), which may work relatively well outdoors in good signal conditions, but may be unavailable or inaccurate indoors. In another example, altitude data could be determined according to an altitude map representing altitudes respectively at different locations. In yet another example, a barometer (e.g., in a mobile device) may provide altitude/pressure data (e.g., pressure measurements) that can be used to estimate or determine altitude changes of a mobile device. In this regard, reference altitudes, which may be GNSS-based and/or based on an altitude map, could be used in combination with altitude changes determined according to barometer measurements, so as to determine new altitude(s) of a mobile device. Other examples are also possible.

Generally, altitude data in a given fingerprint could represent altitude(s) of a mobile device substantially at the time the mobile device observed or otherwise determined certain (e.g., radio) measurements. For instance, a mobile device could provide, to server system 102, a fingerprint including radio measurement(s) by the mobile device and altitude data representing an altitude of the mobile device substantially during the radio measurement(s). And if the server system 102 has information indicating respective altitude(s) of floor(s) in a building, the altitude data in the fingerprint could be used to determine floor(s) at which the radio measurement(s) were performed. As such, server system 102 could associate certain altitude data with certain radio measurements, so as to generate or update a radio map to accurately represent characteristics of radio signals expected to be observable respectively at different attitudes/floors of an indoor area, which in turn could enable accurate positioning estimations, e.g., in a multi-level building.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Also, it could be possible to use volunteers to actively survey area(s) so as to enable collection of fingerprint(s) for those area(s). Other examples are also possible.

Given that collection of fingerprint(s) may allow for understanding of how radio signals behave and travel in an area (e.g., a building), the server system 102 could use the collected fingerprint(s) in various ways to generate or update a radio map for the area.

By way of example, the server system 102 could define a grid having a plurality of points at e.g., intersecting lines. The server system 102 may defined the grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS value(s) and/or associated radio device identifier(s) included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g. barometric/altitude information that may assist in determining a floor level as part of the position estimate. Nevertheless, the server system 102 can compare information in the measurement report to the radio map, to determine a position estimate. For example, the server system 102 could determine that radio device identifier(s) and RSS value(s) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally. Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, when it is desired to reduce a load on the server system 102 (e.g., reduce the extent of processing by the server system 102), when the mobile device seeks to obtain a position estimate relatively quickly (e.g., a very short time-to-first-fix), or in other situations.

In any case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

Figure 2A:
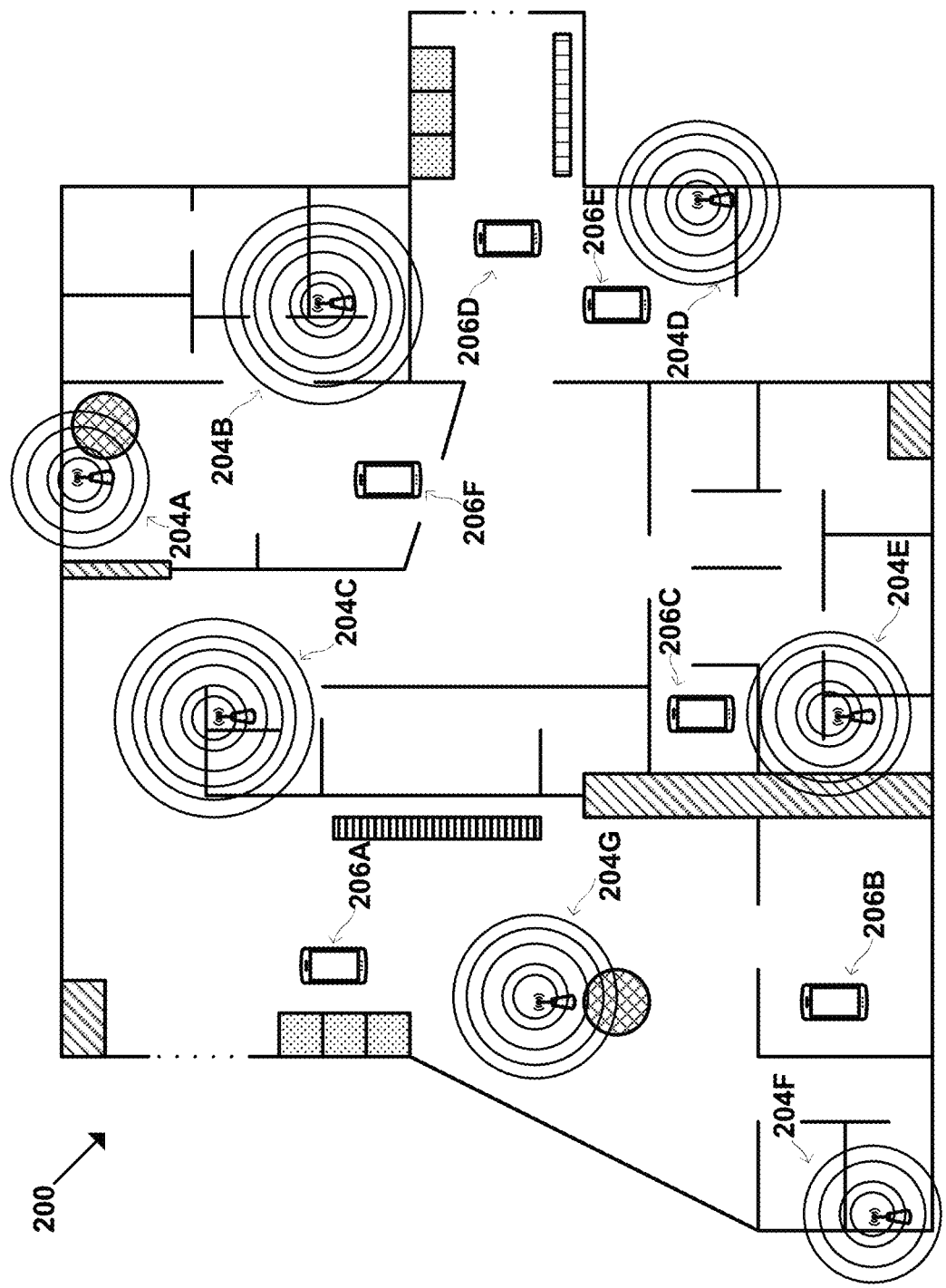
FIGS. 2A and 2B illustrate an indoor area at which radio device(s) and mobile device(s) can be located, in accordance with an example implementation.
Figure 2B:
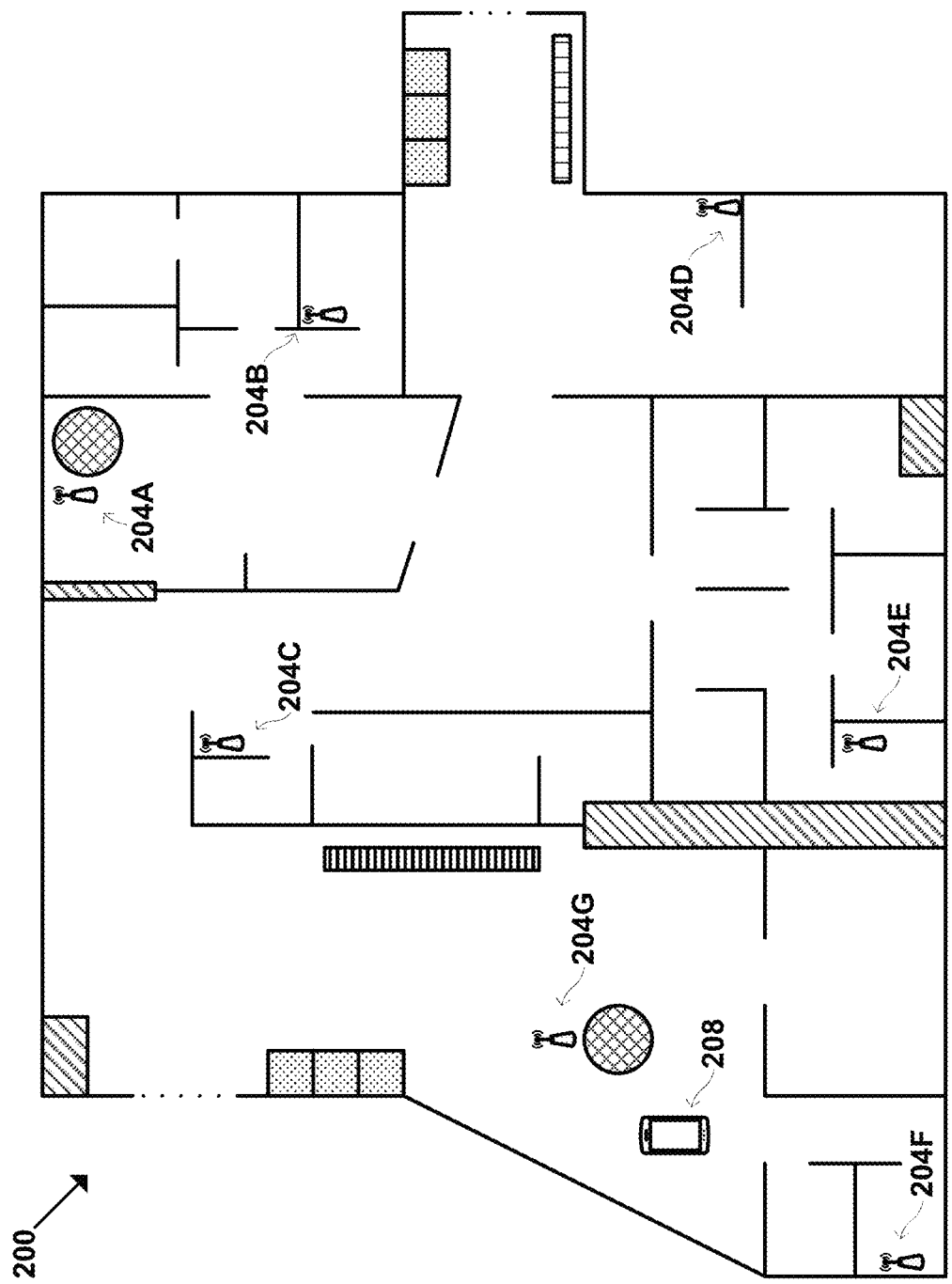
Figure 2C:
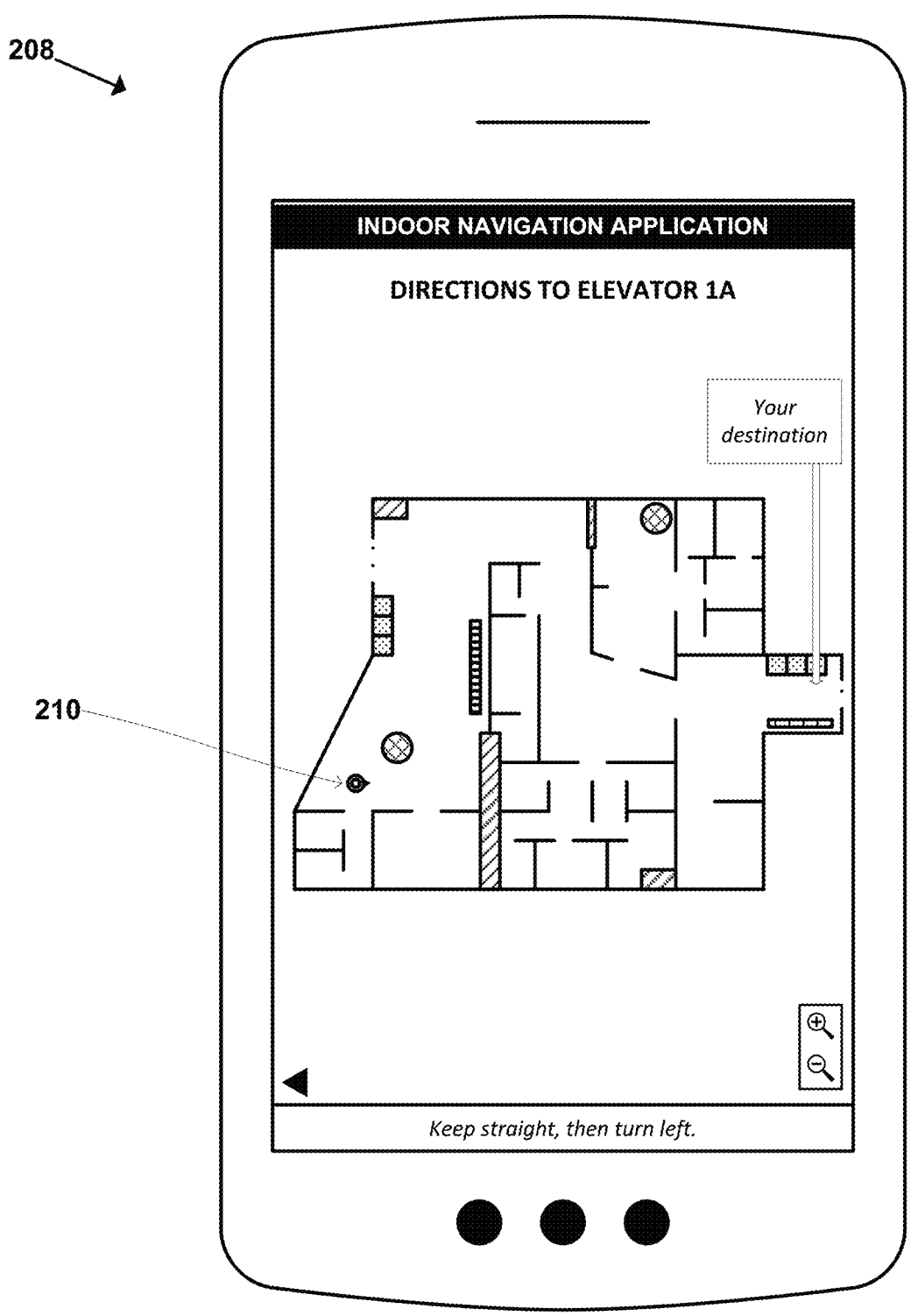
FIG. 2C illustrates an example indoor navigation application, in accordance with an example implementation.

FIGS. 2A to 2C next illustrate an example implementation and use of the above-described positioning solution.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G emits radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprint(s) indicating position estimate(s) and the corresponding radio measurement(s). In turn, the positioning server may generate or update a radio map for indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics of the radio environment at its current position by measuring radio signals emitted by one or more of the radio devices 204A-204G. The mobile device 208 could then refer to the radio map that was generated or updated as described in associated with FIG. 2A, and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible.

II. Example Tracking Systems

Figure 3:
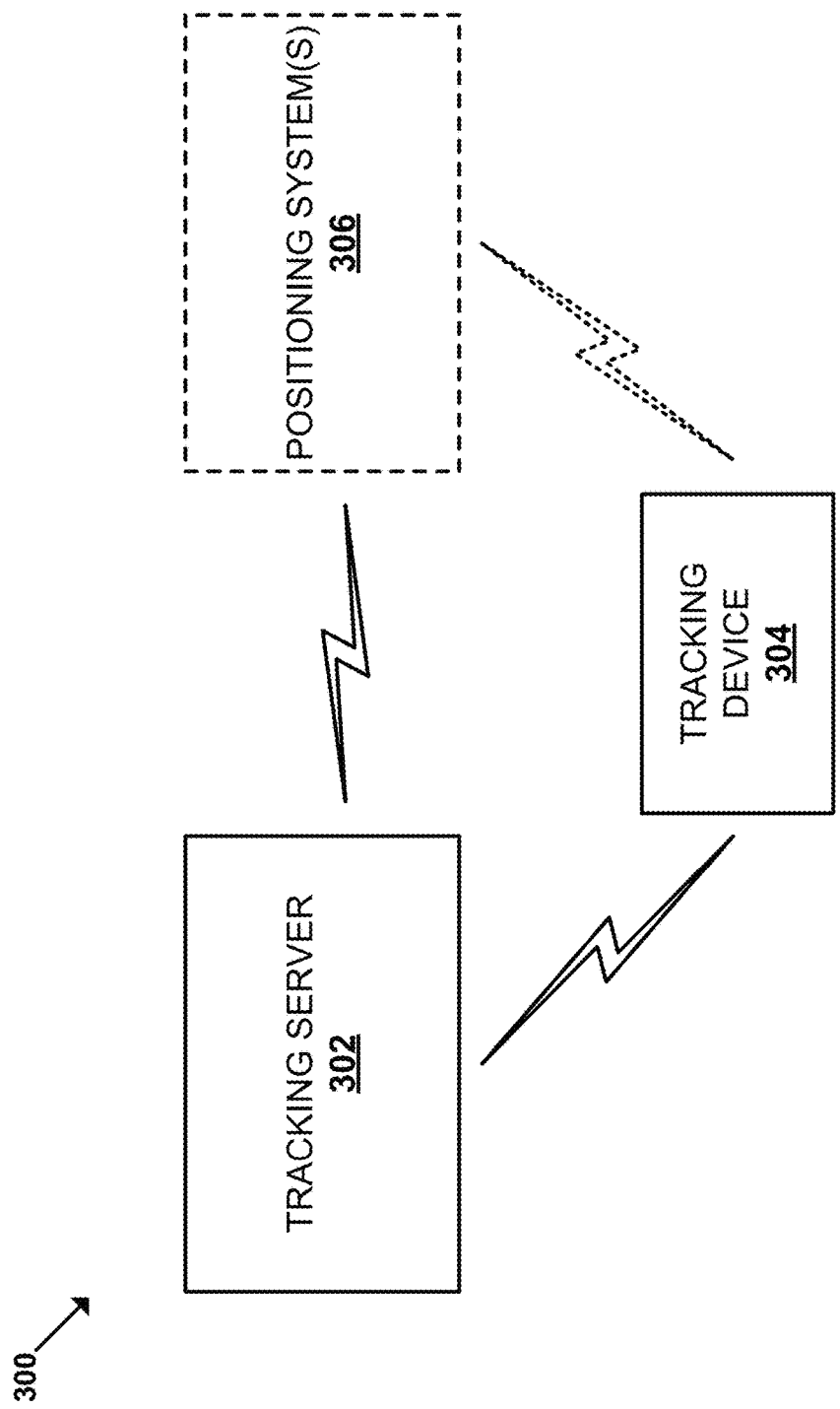
FIG. 3 illustrates an example arrangement of a tracking system, in accordance with an example implementation.

FIG. 3 next illustrates an example tracking system 300, in accordance with example embodiments. As shown, the tracking system 300 includes a tracking server 302 and a tracking device 304. The tracking server 302 could be configured to respectively engage in communication(s) with positioning system(s) 306, and tracking device 304 could also optionally be configured to respectively engage in communication(s) with positioning system(s) 306. Such positioning system(s) 306 may include radio-based positioning system(s), such as those described with respect to FIG. 1, and/or GNSS-based positioning system(s), among other options.

Generally speaking, the tracking server 302 and tracking device 304 could respectively take various forms without departing from the scope of the present disclosure. By way of example, tracking server 302 could include a single server or a plurality of servers (e.g., forming a server cloud). Also, the tracking device 304 could be a mobile device and/or an electronic tracker that can attach to or be disposed within asset(s) to be tracked. Other examples are also possible.

In practice, the tracking system 300 could request position estimate(s) from a radio-based positioning system of positioning system(s) 306. The request(s) for position estimate(s) could take the form of Application Programming Interface (API) calls from the tracking system 300 to the positioning system, among other options. Such request(s) could include data representing measurements of a radio environment. In particular, tracking device 304 could collect measurements of a radio environment, which may include any type(s) of measurements describe herein (e.g., RSS and identifiers of radio nodes). And tracking device 304 could transmit data representing such measurements directly to the positioning system or via tracking server 302.

Once the radio-based positioning system receives such a request, the positioning system could use the measurements as basis for generating and providing a position estimate. In particular, the positioning system could use the measurements and a radio map to estimate a position of the tracking device 304, and could do so, e.g., as described with respect to FIG. 1. In practice, the radio map could be one providing coverage for the area at which a tracking device is located among other possibilities. In any case, once the position estimate is generated, the positioning system could then provide the requested position estimate to the tracking server 302, to the tracking device 304, and/or to another entity etc.

Given this, the tracking server 302 could collect GNSS-based, radio-based, and/or other position estimates so as to generate or otherwise maintain a location trace for a tracked entity. The tracked entity could be the tracking device 304 itself and/or could be an asset to which the tracking device 304 is attached, among other options. In any case, the location trace could be a record of position estimates for the tracked entity and could optionally indicate times respectively associated with the position estimates. Such a location trace could be stored in a database accessible to the tracking server 302 and/or other entities. Additionally or alternatively, in line with the discussion above, such a location trace could be made available to user(s) via their devices, so that the user(s) could have information related to the whereabouts of the tracked entity.

III. Illustrative Methods

As noted above, the present disclosure is directed to an improved approach for identifying radio nodes that cause inclusion of unsuitable data in radio maps, such as data that degrades radio-based positioning performance. This approach involves a feedback loop between a positioning system and any client of the positioning system that can determine if a position estimate is incorrect. Through this feedback loop, the client could inform the positioning system about any radio node(s) associated with an incorrect position estimate, so that the positioning system could in turn exclude one or more of those node(s) from radio map(s). Although the feedback loop could be established with any client of the positioning system, the disclosed approach is described herein in the context of a tracking system as the client. In any case, the disclosure approach could help improve positioning performance of an indoor and/or outdoor radio-based positioning system and could provide for other benefits as well.

In line with the discussion above, a tracking system could request and receive a position estimate from a positioning system. As noted, the request to the positioning system could include radio-related measurements (e.g., RSS) and identifier(s) of radio node(s). Once the positioning system determines a position estimate using the information in the request, the positioning system could transmit the position estimate to the tracking system along with identifiers of radio node(s) that were relied upon for the position estimation. In this way, the tracking system could be informed about radio node(s) associated with the position estimate, which may in turn enable the tracking system to inform the positioning system about those radio node(s) if the position estimate is determined to be incorrect, in line with the disclosed feedback loop.

Accordingly, once the tracking system receives the requested position estimate, the tracking system could make a determination of whether the position estimate is incorrect, and could do so in various ways without departing from the scope of the present disclosure.

By way of example (and without limitation), the tracking system could determine that a position estimate is incorrect based on the position estimate being an outlier relative to other position(s) in a location trace. In practice, the tracking system may already be configured with such functionality so as to ensure accuracy of location trace(s) generated by the tracking system. Thus, the present disclosure may effectively leverage this existing functionality, to provide for the various benefits described herein without necessarily having to deploy additional and perhaps computationally intensive processes to determine whether a position estimate is incorrect.

Nonetheless, the tracking system could use one or more of various techniques to determine that the position estimate is an outlier relative to other position(s) in a location trace. For instance, the tracking system could determine a distance between the position represented by the position estimate and a particular position associated with the location trace. This particular position could be a most recently estimated position for the location trace, a previously estimated position for the location trace, a future position projected or otherwise estimated based on the location trace, or a future position expected for a tracked entity (e.g., according to a predetermined route for the tracked entity), among others. In either case, if the tracking system determines that the distance at issue is greater than a pre-defined threshold distance, the tracking system may deem the position estimate to be an outlier and thus incorrect. Other techniques are also possible.

According to the present disclosure, if the tracking system determines that the position estimate is incorrect, the tracking system may responsively transmit, to the positioning system, an indication corresponding to the position estimate being incorrect. The indication may indicate radio node(s) associated with the position estimate deemed to be incorrect, such as by including their respective identifiers. In practice, radio node(s) are considered to be associated with the position estimate if the positioning system generates the position estimate based on measurements on signal(s) emitted by those radio node(s). As discussed, the positioning system could inform the tracking system about such associated radio node(s) when providing the position estimate.

In this regard, the tracking system could provide such an indication synchronously or asynchronously. For example, the tracking system could provide an indication corresponding to a position estimate being incorrect and do so after receipt of the position estimate, but without waiting for receipt of any additional position estimates. Additionally or alternatively, the tracking system could receive and deem two or more position estimates to be incorrect without providing any intervening indication(s) between receipts of these position estimates, and the tracking system could then provide, to the positioning system at a later point in time, an indication of any radio node(s) associated with those multiple position estimates, thereby providing the indication at issue asynchronously in a "batch-based" manner. Other examples are also possible.

Once the positioning system receives the above-described indication, the positioning system could then have information about radio node(s) that may need to be excluded from radio map(s). Such radio node(s) may include mobile radio node(s) that change a radio environment due to their movement, thereby leading to radio map(s) no longer accurately representing the radio environment. Additionally or alternatively, the radio node(s) could include any other node(s) that may contribute, for any feasible reason, to inaccuracies in position estimate(s).

Accordingly, the positioning system may use the indication as basis for performing a procedure to exclude, from a radio map, one or more of the radio nodes identified in the indication.

In particular, the positioning system could exclude a radio node from a radio map by removing, from the radio map, data associated with the radio node. Such data may include an identifier of the radio node, value(s) associated with radio-related measurement(s) of signals emitted by the radio node, and/or position estimate(s) (e.g., included in fingerprint(s) provided during the above-described crowdsourcing process), among other possibilities.

For example, as discussed, the radio map generation and/or updating process may involve defining a grid to cover a site such that each grid point corresponds to a geographical location at the site. In this process, the positioning system could map RSS value(s) and/or associated radio node identifier(s) respectively to grid point(s). Given this, if the positioning system receives an indication of radio node(s) associated with a position estimate deemed to be incorrect, the positioning system could remove, from the radio map, any RSS value(s) associated with those radio nodes and/or any identifier(s) of those radio node(s). Such removal procedure could involve deleting value(s)/identifier(s) and/or deleting stored mapping(s) between value(s)/identifier(s) and corresponding grid point(s), among other options.

In some situations, as discussed, the positioning system could generate an RSS value for a particular grid point by interpolating surrounding RSS values if possible, and by extrapolating neighboring RSS values otherwise. In such situations, if one of the surrounding or neighboring RSS values corresponds to a particular radio node and the positioning system receives an indication that this radio node is associated with a position estimate deemed to be incorrect, the positioning system could responsively re-generate the RSS value for the particular grid point. In doing so, the positioning system could interpolate surrounding RSS values and/or extrapolate neighboring RSS values while disregarding any surrounding and/or neighboring RSS value(s) that correspond to the particular radio node deemed unsuitable for inclusion in a radio map, in accordance with the present disclosure. Other examples are also possible.

Additionally or alternatively, the procedure to exclude radio node(s) may involve blacklisting one or more of those radio node(s). In particular, the positioning system may add "unsuitable" radio node(s) to a list stored in a database accessible to the positioning system. The list may include radio node(s) that should be excluded from radio map(s), thereby helping to prevent addition, to a radio map, of data associated with those node(s).

For example, if the positioning system receives and/or generates data that is candidate for addition to a radio map, the positioning system could refer to the list to determine whether radio node(s) associated with that data are included in the list. And if the positioning system determines that those radio node(s) are indeed included in that list, the positioning system may not add the associated data to the radio map.

In a more specific example, the positioning system may receive a fingerprint including a position estimate, value(s) of radio-related measurement(s), and an identifier of a radio node. But if the positioning system determines that this radio node has been blacklisted in accordance with the present disclosure, the positioning system may responsively avoid using that fingerprint as basis for generating or updating a radio map. Other examples are also possible.

Furthermore, the positioning system may exclude a radio node from any feasible radio map, and may exclude the radio node from one or multiple radio maps.

For example, the positioning system may exclude a radio node from a radio map used for generating a position estimate that was deemed to be incorrect. For instance, the positioning system may use a particular radio map for generating a position estimate. And if the tracking system indicates to the positioning system that the position estimate is incorrect and includes in this indication an identifier of a radio node associated with this position estimate, the positioning system may exclude that radio node from the particular radio map at issue.

Additionally or alternatively, the positioning system may exclude a radio node from a radio map other than the one used for generating a position estimate deemed to be incorrect. For instance, the positioning system may use a first radio map for generating a position estimate. And if the tracking system indicates to the positioning system that the position estimate is incorrect and includes in this indication an identifier of a radio node associated with this position estimate, the positioning system may exclude that radio node from a second radio map. This second radio map may be at least partially different from the first radio map. For example, the second radio map may provide coverage for an area that at least partially overlaps with an area covered by the first radio map. In another example, the second radio map could be a global radio map providing coverage on a global scale. Numerous other examples are also possible.

In some situations, a radio node may be associated with an incorrect position estimate but may or may not need to be excluded from radio map(s). For instance, multiple radio nodes may be associated with an incorrect position estimate, but just one of those radio nodes may be a mobile radio node that effectively caused the positing estimate at issue to be incorrect. Given this, it would be advantageous to identify and exclude that mobile radio node, but not exclude any of the other radio nodes. At issue then is how to ascertain which radio node(s) should be excluded.

To help overcome this issue, the positioning system may exclude a radio node from radio map(s) only if the radio node is repeatedly included in indications corresponding to position estimates being incorrect. In other words, rather than having the positioning system exclude the radio node based on a single such indication, the positioning system and/or a client of the positioning system may collect data over time related to the radio node being associated with incorrect position estimate(s), and may evaluate this data so as to determine whether or not to exclude the radio node. In the event that the client performs this evaluation, the client could inform the positioning system about results of this evaluation, so that the positioning system could determine whether or not to exclude the radio node from radio map(s) accordingly. In any case, the positioning system and/or client could perform this evaluation in various ways.

For example, the positioning system could make a determination that a particular radio node has been included in at least a threshold number (e.g., ten) of indications corresponding to position estimates being incorrect. And the positioning system could respond to this determination by excluding this particular radio node from radio map(s). In contrast, the positioning system could make a determination that a different radio node has been included in a particular number (e.g., two) of indications corresponding to position estimates being incorrect, but may also determine that this particular number is lesser than then above-mentioned threshold number. Thus, the positioning system may responsively deem that the different radio node at issue should not be excluded from radio map(s). In this way, the positioning system can avoid false positives by ensuring that suitable radio node(s) are not excluded from radio map(s), and that unsuitable radio node(s) are excluded from radio map(s) when applicable.

Figure 4:
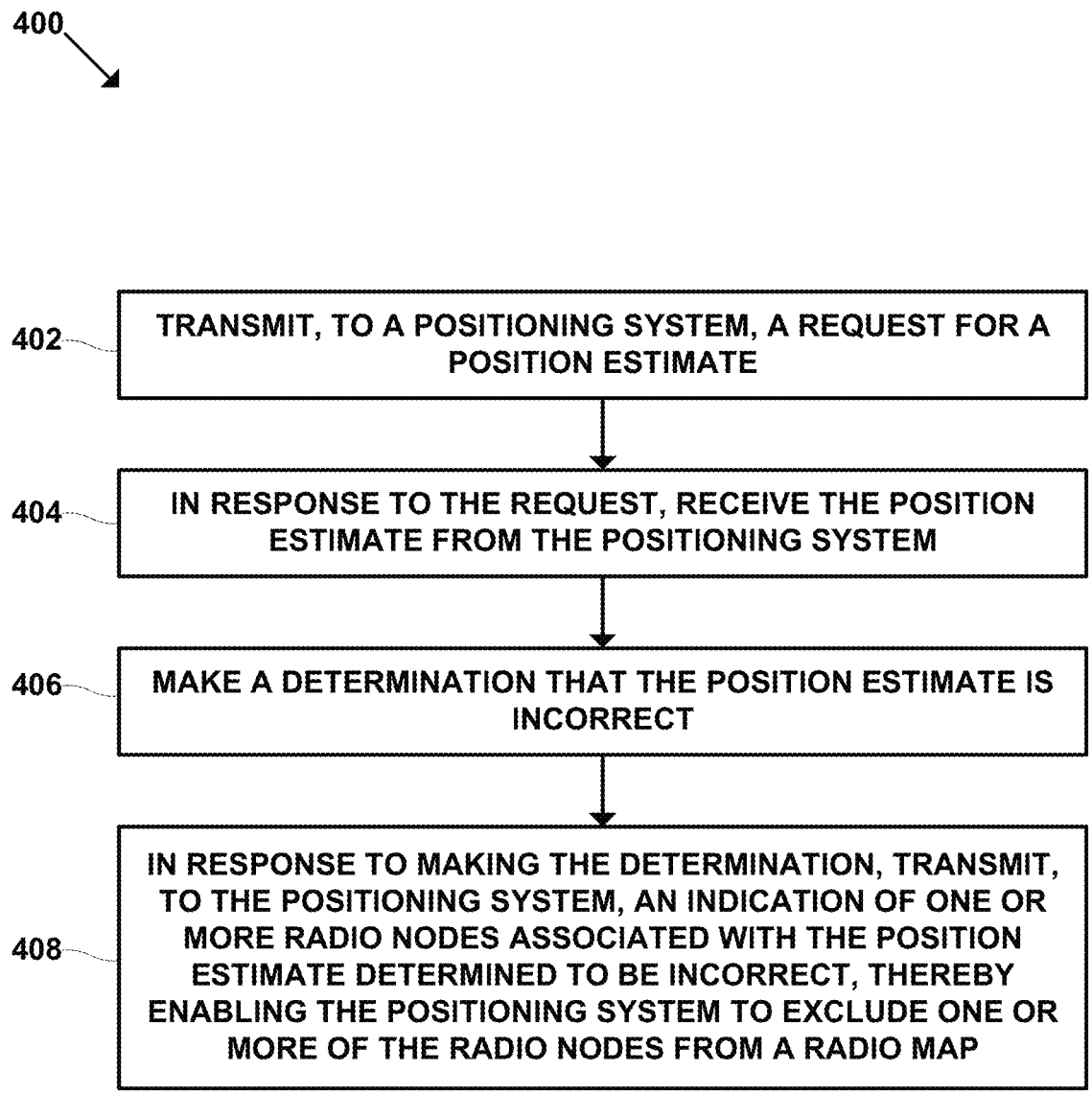
FIG. 4 is an example flowchart related to a feedback loop for improving positioning quality, in accordance with an example implementation.
Figure 5:
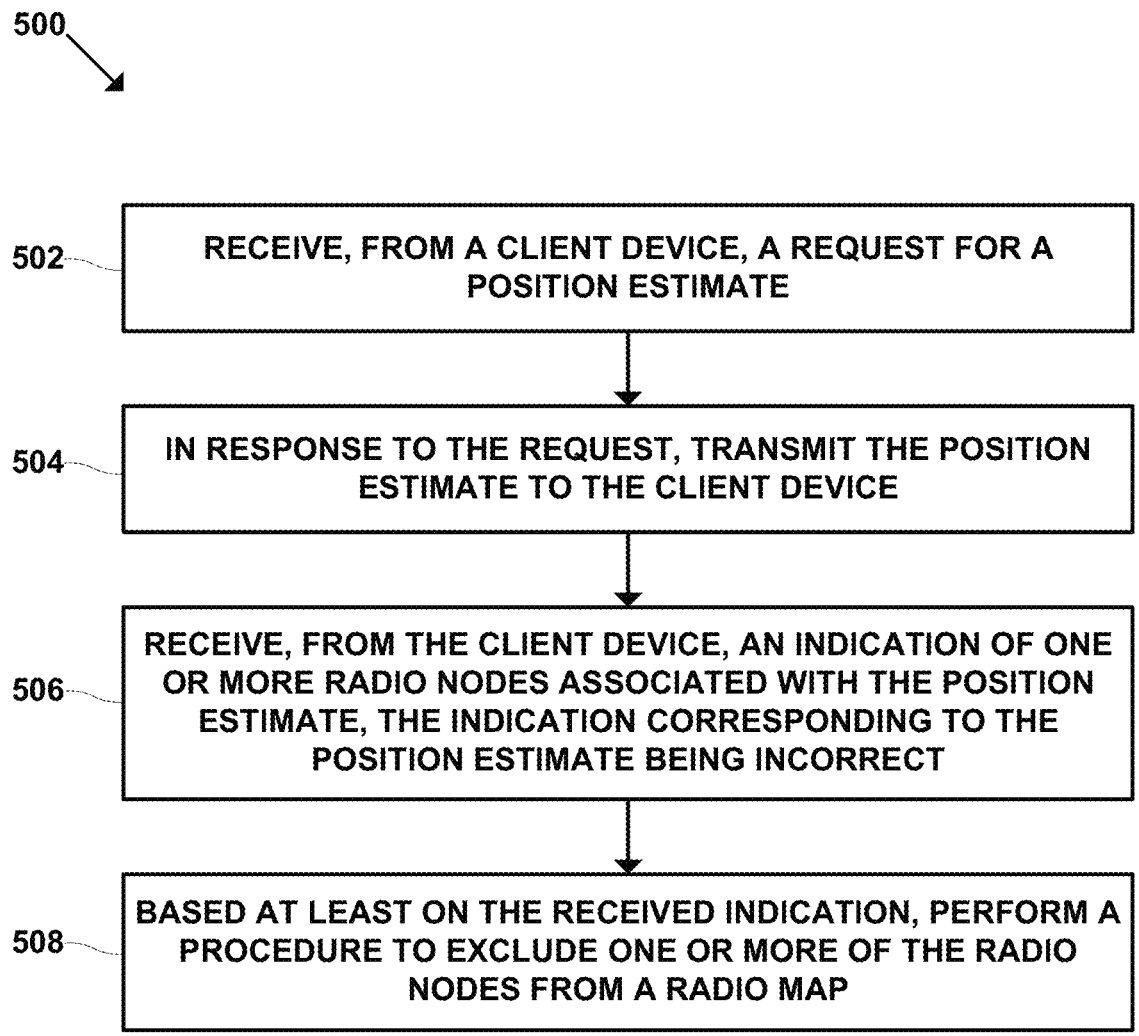
FIG. 5 is another example flowchart related to a feedback loop for improving positioning quality, in accordance with an example implementation.

In another example, the positioning system could apply any feasible machine learning technique(s) to evaluate whether a radio node should be excluded from radio map(s). For instance, as the positioning system receives indications, from tracking system(s), corresponding to position estimates being incorrect, the positioning system could store such indications in the form of training data. One or more currently known and/or future-developed machine learning algorithms can then be applied to use this training data as basis for generating a model or the like that indicates which radio node(s) should be excluded from radio map(s). Such algorithms may include regression, instance-based, regularization, decision tree, Bayesian, and/or clustering algorithms, among others. Other examples are also possible FIGS. 4 and 5 are next flowcharts respectively illustrating methods 400 and 500, in accordance with the present disclosure. Methods 400 and 500 could be respectively performed by and/or in an arrangement involving a server device, a mobile device, and/or any other device or system. Also, it should be understood that, if a method is performed by a given entity, the given entity could engage in communication(s) with one or more other entities as necessary to obtain and/or provide any feasible information as understood by one of ordinary skill in the art, to enable the given entity to perform operations described herein and/or to inform another entity about results, among other possibilities. Moreover, in some implementations, the various operations described herein could be distributed among one or more entities, such as in accordance with a client-server arrangement or the like. Other arrangements are also possible.

In an example implementation, method 400 could be performed by and/or in an arrangement involving a client of a positioning system, such as by a tracking server and/or tracking device (e.g., tracking system 300), or more particularly by component(s)/module(s) (e.g., processor(s)) thereof, among other possibilities. As shown, method 400 involves operations in accordance with blocks 402 to 408. In particular, at block 402, method 400 may involve transmitting, to a positioning system, a request for a position estimate. And at block 404, method 400 may involve, in response to the request, receiving the position estimate from the positioning system. Then, at block 406, method 400 may involve making a determination that the position estimate is incorrect. And at block 408, method 400 may involve, in response to making the determination, transmitting to the positioning system, an indication of one or more radio nodes associated with the position estimate determined to be incorrect, thereby enabling the positioning system to exclude one or more of the radio nodes from a radio map.

Furthermore, in an example implementation, method 500 could be performed by and/or in an arrangement involving a positioning system, such as by a positioning server and/or tracking device (e.g., server system 102), or more particularly by component(s)/module(s) (e.g., processor(s)) thereof, among other possibilities. As shown, method 500 involves operations in accordance with blocks 502 to 508. In particular, at block 502, method 500 may involve receiving, from a client device, a request for a position estimate. And at block 504, method 500 may involve, in response to the request, transmitting the position estimate to the client device. Further, at block 506, method 500 may involve receiving, from the client device, an indication of one or more radio nodes associated with the position estimate, the indication corresponding to the position estimate being incorrect. And at block 508, method 500 may involve, based at least on the received indication, performing a procedure to exclude one or more of the radio nodes from a radio map.

Although certain methods have been described, it should be understood that other processes and/or modification of one or more of the described processes may also be possible in the context of the present disclosure.

IV. Example Hardware and Software

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
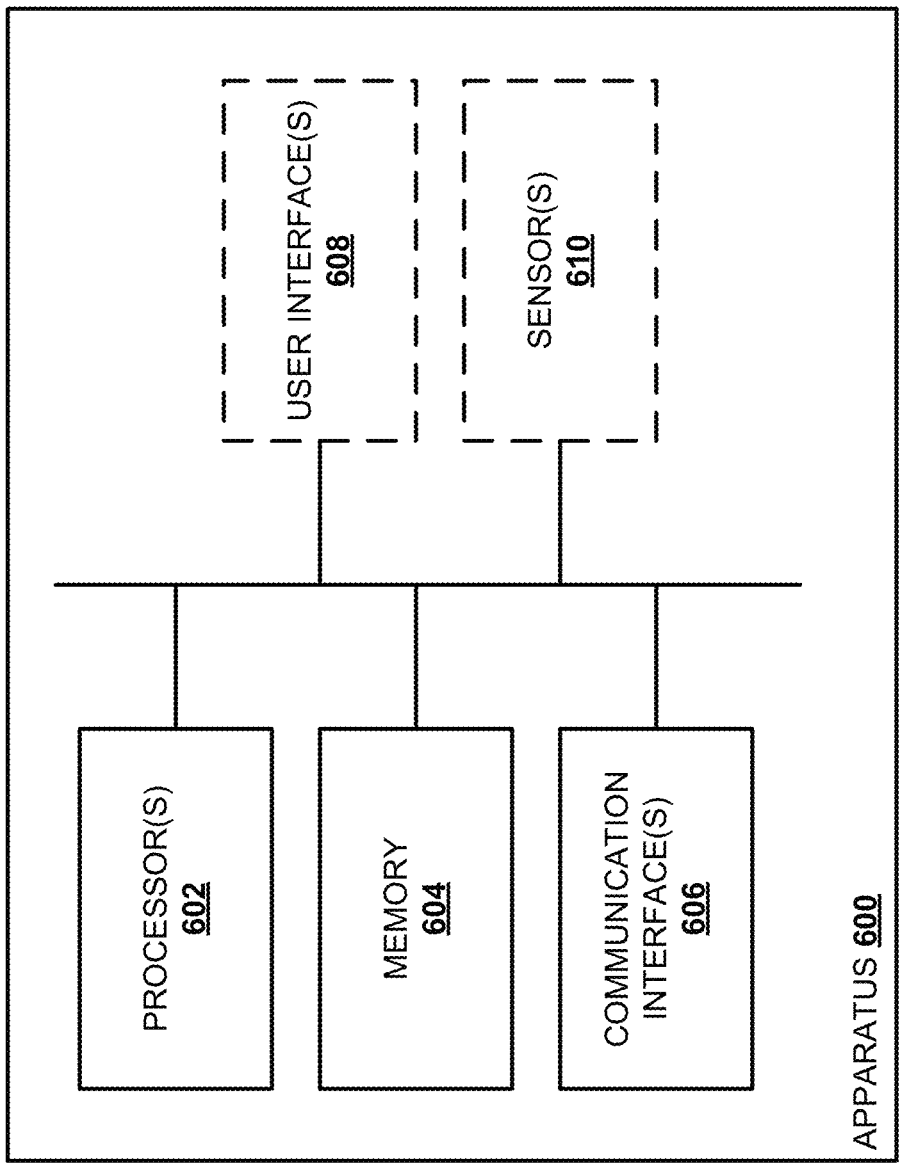
FIG. 6 illustrates an example apparatus, in accordance with an example implementation.

FIG. 6 is a schematic block diagram of an apparatus 600 that may be involved in a feedback loop for improving performance of a radio-based positioning system, according to an example embodiment. The apparatus 600 could, for instance, represent a server (e.g., server system 102) or a mobile device (e.g., one of the mobile devices 106), among other options. Moreover, the apparatus 600 could take the form of or otherwise be part of a system, such as any of those described herein.

As shown, apparatus 600 could include processor(s) 602, a memory 604 (e.g., database 108), communication interface(s) 606, an (optional) user interface(s) 608, and (optional) sensor(s) 610. Some or all of the components of the apparatus 600 may be connected via a bus (or other mechanism) and/or be combined into one or more modules.

Processor(s) 602 could have numerous functions, such as controlling the memory 604, communication interface(s) 606, the user interface(s) 608, and/or the sensor(s) 610 in any feasible manner currently known or developed in the future. For example, the memory 604 could include or otherwise contain computer program code (program instructions), and the processor(s) 602 may be configured to execute the program code to cause the apparatus 600 to perform and/or control operations, such as any of those described herein and/or other operations. Thus, apparatus 600 and/or processor(s) 602 could be referred to as carrying out such operations.

Moreover, processor(s) 602 (and also any other processor(s) mentioned herein) may be processor(s) of any suitable type. For example (and without limitation), processor(s) 602 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 604 could also take various form without departing from the scope of the present disclosure. In particular, memory 604 could be separate from processor(s) 602. Additionally or alternatively, memory 604 may be part of or otherwise integrated with one or more of the processor(s) 602. In this case, memory 604 may be fixed to the from processor(s) 602 or may be at least partially removable from the processor(s) 602. In any case, the memory 604 be or take the form of volatile and/or nonvolatile memory, and could include program memory, working memory, and/or data memory, among others.

By way of example (and without limitation), memory 604 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 604 may additionally or alternatively include an operating system for processor(s) 602 and/or firmware for apparatus 600. Further, memory 604 could additionally or alternatively be used by processor(s) 602 when executing an operating system and/or computer program. Moreover, memory 604 could additionally or alternatively store data, such as any types, sets, instances, and/or samples of data described herein. Other examples are also possible.

Further, communication interface(s) 606 could enable the apparatus 600 to communicate with other entities. The communication interface(s) 606 may, for instance, include a wireless interface (e.g. a cellular radio communication interface and/or a WLAN interface) and/or wire-bound interface (e.g. an IP-based interface, for instance to communicate with entities via the Internet). Moreover, the communication interface(s) 606 may take the form of or provide for wireless and/or wired communication with transmitting and/or receiving device(s), such as one or more antenna(s) and/or radio receiver(s) of the apparatus 600.

Yet further, user interface(s) 608 could be any device(s) for presenting and/or receiving information. For instance, user interface(s) 608 include display device(s), audio device(s) or the like for visually and/or audibly providing information (e.g., to a user). Additionally or alternatively, user interface(s) 608 could include input device(s) (e.g. a keyboard, keypad, touchpad, mouse, etc.) for receiving information (e.g., based on input provided by a user).

Finally, sensor(s) 610 could include any type(s) of sensor(s) currently known and/or developed in the future. For example, sensor(s) 610 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 600 to perform radio measurements (e.g., Bluetooth and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

V. Example Geographic Database

Figure 7:
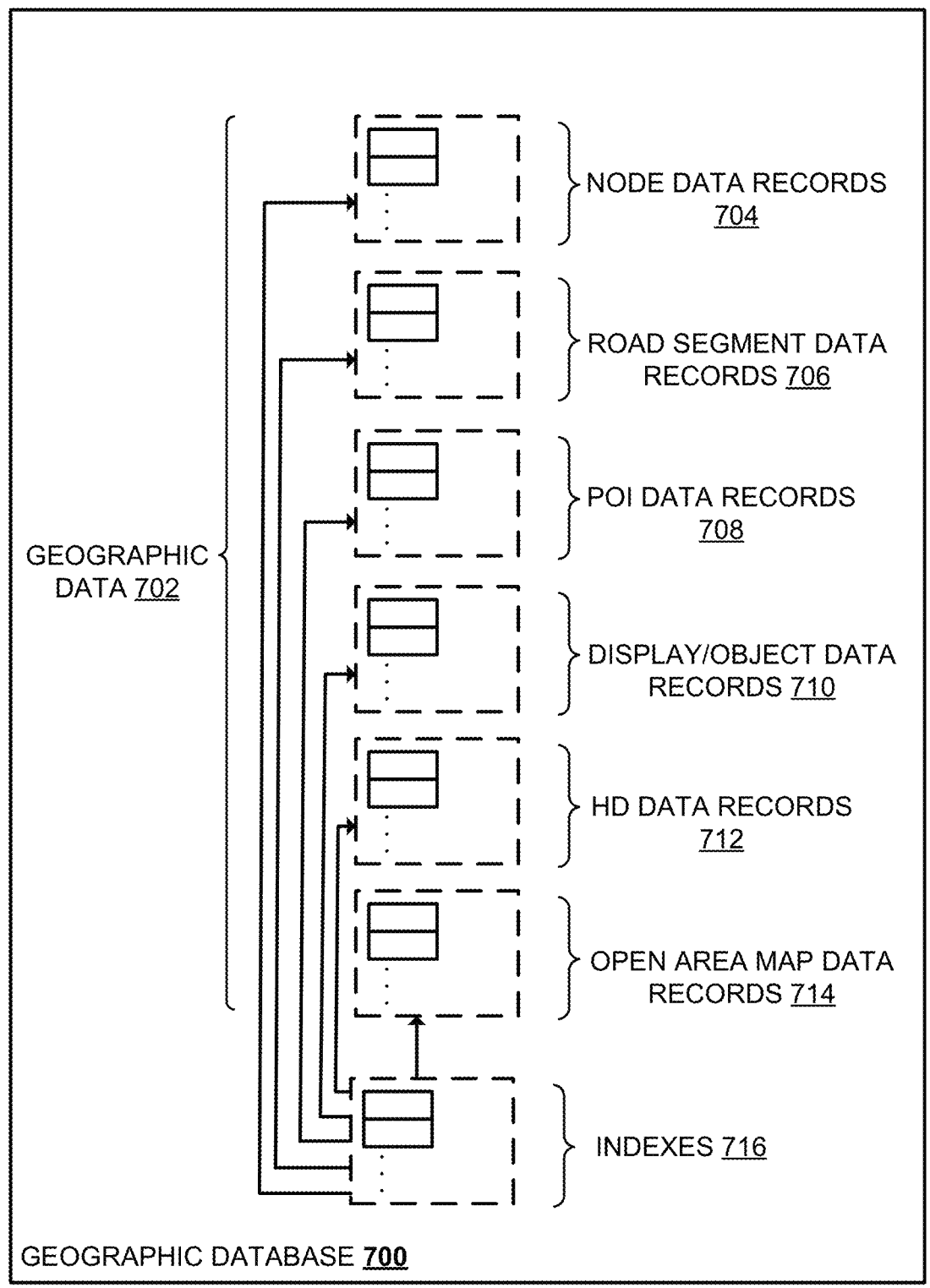
FIG. 7 illustrates a diagram of a geographic database, in accordance with an example implementation.

FIG. 7 illustrates a diagram of a geographic database 700, according to an example implementation. Geographic database 700 could be included within, integrated with, or be separate from another database, data storage device, memory, or the like described herein (e.g., memory 604). Additionally or alternatively, geographic database 700 could be stored on or otherwise made accessible to any entity described herein without departing from the scope of the present disclosure. Moreover, although certain aspects of the geographic database are described in the context of outdoor mapping and/or outdoor navigation-related services, it should be understand that some or all such aspects could extend to apply in the context of indoor mapping and/or indoor navigation-related services.

In this regard, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in other ways as well.

More specifically, the geographic database 700 may include geographic data 702 used for (or configured to be compiled to be used for) mapping and/or navigation-related services. For instance, the geographic database 700 may include high resolution or high definition (HD) mapping data that provide centimeter-level or better accuracy of map features. By way of example, the geographic database 700 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., HD data records 712) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 700, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 700.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 700 may follow certain conventions. For example, links might not cross themselves and might not cross each other except at a node. Also, there may be no duplicated shape points, nodes, or links. Two links that connect each other may have a common node. In the geographic database 700, overlapping geographic features may be represented by overlapping polygons. When polygons overlap, the boundary of one polygon may cross the boundary of the other polygon. In the geographic database 700, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 700 may be stored as a hierarchical or multi-level tile-based projection or structure. More specifically, in one embodiment, the geographic database 700 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 700 may include node data records 704, road segment or link data records 706, Points of Interest (POI) data records 708, display/object data records 710, HD mapping data records 712, open area map data records 714, and indexes 716, for example. More, fewer or different data records can be provided. For example, other data records can include cartographic data records, routing data, and/or maneuver data. Further, the indexes 716 may improve the speed of data retrieval operations in the geographic database 700. For instance, the indexes 716 may be used to quickly locate data without having to search every row in the geographic database 700 every time it is accessed. For example, in one embodiment, the indexes 716 can be a spatial index of the polygon points associated with stored feature polygons.

In exemplary embodiments, the road segment data records 706 may be links or segments representing roads, streets, or paths, as can be used in a calculated or recorded route information for determination of one or more personalized routes. The node data records 704 may be end points corresponding to the respective links or segments of the road segment data records 706. The road link data records 706 and the node data records 704 may represent a road network, such as used by vehicles, cars, and/or other entities. Alternatively, the geographic database 700 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related attributes, room names/ identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 700 can include data about the POIs and their respective locations in the POI data records 708. The geographic database 700 can also include data about places, such as cities, towns, or other communities, and other geographic features, such as bodies of water, mountain ranges, etc. Such place or feature data can be part of the POI data records 708 or can be associated with POIs or POI data records 708 (such as a data point used for displaying or representing a position of a city). Other examples are also possible.

In some implementations, the geographic database 700 can include display/object data records 710 for storing machine-readable visual representations and map data decoded from the visual representations and their respective properties. In addition, the display/object data records 710 can store post-processing rule sets for correcting and/or reducing the uncertainties in the display/object data decoded from clustered machine-readable visual representations. The display/object data records 700 can also store data selection rules (e.g., in a map data extension layer) for selecting from among multiple sets of readings of a machine-readable visual representation. The display/object data records 700 can also store confidence or accuracy determinations for the decoded map data. By way of example, the display/object data records 700 can be associated with one or more of the node records 704, road segment records 706, and/or POI data records 708 to support uses cases such as enhanced mapping user interfaces (UIs), autonomous driving, dynamic map updates, etc. In some cases, the display/object data records 710 may be stored as a data layer of the hierarchical tile-based structure of the geographic database 700 according to the various embodiments described herein.

In some implementations, as discussed above, the HD mapping data records 712 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 700 can be maintained by a content provider in association with a services platform (e.g., a map developer). The map developer can collect geographic data to generate and/or enhance the geographic database 700. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 700 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 700 could additionally or alternatively include open area map data record(s) 714 for open area map(s). Generally speaking, open area map(s) may include image(s) or the like of respective layout(s) representing pedestrian walkable area(s) (e.g., indoor area(s), such as one or more floors of a building), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 700). The geographic map may be or include geographic data (e.g., any feasible data from records 704-712) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 700 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

VI. Conclusion

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
   transmitting, by one or more processors and to a positioning system, a request for a position estimate;
   in response to the request, receiving, by the one or more processors, the position estimate from the positioning system;
   making a determination, by the one or more processors, that the position estimate is incorrect; and in response to making the determination, transmitting, by the one or more processors and to the positioning system, an indication of one or more radio nodes associated with the position estimate determined to be incorrect, thereby enabling the positioning system to exclude one or more of the radio nodes from a radio map.

2. The method of claim 1,
wherein the one or more processors are of a tracking system configured to generate a location trace associated with an entity, and
wherein the request for the position estimate enables generation of the location trace.

3. The method of claim 2, wherein making the determination comprises determining that the position estimate is an outlier relative to other positions in the location trace.

4. The method of claim 1, wherein the position estimate is based at least on measurements of radio signals respectively emitted by the one or more radio nodes, thereby causing the association between the position estimate and the one or more radio nodes.

5. The method of claim 4, wherein the request includes the measurements and respective identifiers of the one or more radio nodes.

6. A method comprising:
receiving, by one or more processors of a positioning system and from a client device, a request for a position estimate;
in response to the request, transmitting, by the one or more processors, the position estimate to the client device;
receiving, by the one or more processors and from the client device, an indication of one or more radio nodes associated with the position estimate, the indication corresponding to the position estimate being incorrect; and
based at least on the received indication, performing, by the one or more processors, a procedure to exclude one or more of the radio nodes from a radio map.

7. The method of claim 6,
wherein the client device is a tracking system configured to generate a location trace associated with an entity, and
wherein the request for the position estimate enables generation of the location trace.

8. The method of claim 6, further comprising:
in response to the request, generating, by the one or more processors, the position estimate based at least on a particular radio map,
wherein the excluding comprises excluding one or more of the radio nodes from the particular radio map used as basis for generating the position estimate.

9. The method of claim 6, further comprising:
in response to the request, generating, by the one or more processors, the position estimate based at least on a first radio map,
wherein the excluding comprises excluding one or more of the radio nodes from a second radio map, the second radio map being at least partially different from the first radio map used as basis for generating the position estimate.

10. The method of claim 6, wherein performing the procedure comprises performing one or more of the following operations:
(i) removing, from the radio map, data associated with the one or more excluded radio nodes, or
(ii) backlisting the one or more excluded radio node to prevent addition, to the radio map, of data associated with the one or more excluded radio nodes.

11. The method of claim 10, wherein the data associated with the one or more excluded radio nodes corresponds to one or more of the following: (i) one or more respective identifiers of one or more of the excluded radio nodes, (ii) one or more measurements of radio signals respectively emitted by one or more of the excluded radio nodes, or (iii) one or more position estimates determined based on one or more of the measurements.

12. The method of claim 6, wherein performing the procedure based at least on the received indication comprises:
making a determination that a particular one of the radio nodes has been included in a plurality of indications corresponding to position estimates being incorrect, the plurality including the received indication; and
based on the determination, performing the procedure to exclude the particular radio node from the radio map.

13. The method of claim 12, wherein making the determination comprises making a determination that the particular radio node has been included in at least a threshold number of indications corresponding to position estimates being incorrect.

14. An apparatus comprising:
one or more processors;
a non-transitory computer readable medium; and
program instructions stored on the non-transitory computer readable medium and executable by the one or more processors to:
transmit, to a positioning system, a request for a position estimate;
in response to the request, receive the position estimate from the positioning system;
make a determination that the position estimate is incorrect; and
in response to making the determination, transmit, to the positioning system, an indication of one or more radio nodes associated with the position estimate determined to be incorrect, thereby enabling the positioning system to exclude one or more of the radio nodes from a radio map.

15. The apparatus of claim 14,
wherein the apparatus is part of or takes the form of a tracking system configured to generate a location trace associated with an entity, and
wherein the request for the position estimate enables generation of the location trace.

16. The apparatus of claim 14, wherein making the determination comprises determining that the position estimate is an outlier relative to other positions in the location trace.

17. An apparatus comprising:
one or more processors;
a non-transitory computer readable medium; and
program instructions stored on the non-transitory computer readable medium and executable by the one or more processors to:
receive, from a client device, a request for a position estimate;
in response to the request, transmit the position estimate to the client device;
receive, from the client device, an indication of one or more radio nodes associated with the position estimate, the indication corresponding to the position estimate being incorrect; and based at least on the received indication, perform a procedure to exclude one or more of the radio nodes from a radio map.

18. The apparatus of claim 17,
wherein the apparatus is part of or takes the form of a positioning system that serves the client device,
wherein the client device is part of or takes the form of a tracking system configured to generate a location trace associated with an entity, and
wherein the request for the position estimate enables generation of the location trace.

19. The apparatus of claim 17, wherein performing the procedure comprises performing one or more of the following operations:
  (i) removing, from the radio map, data associated with the one or more excluded radio nodes, or
  (ii) backlisting the one or more excluded radio node to prevent addition, to the radio map, of data associated with the one or more excluded radio nodes.

20. The apparatus of claim 17, wherein performing the procedure based at least on the received indication comprises:
  making a determination that a particular one of the radio nodes has been included in a plurality of indications corresponding to position estimates being incorrect, the plurality including the received indication; and
  based on the determination, performing the procedure to exclude the particular radio node from the radio map.

* * * * *